United States Patent
Chao et al.

(10) Patent No.: US 11,037,007 B2
(45) Date of Patent: Jun. 15, 2021

(54) BIOMETRIC DEVICE AND METHOD THEREOF AND WEARABLE CARRIER

(71) Applicant: Industrial Technology Research Institute, Hsinchu (TW)

(72) Inventors: Chia-Hsin Chao, Hsinchu County (TW); Yen-Hsiang Fang, New Taipei (TW); Ming-Hsien Wu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/596,770

(22) Filed: Oct. 9, 2019

(65) Prior Publication Data

US 2020/0042810 A1 Feb. 6, 2020

Related U.S. Application Data

(63) Continuation of application No. 15/221,615, filed on Jul. 28, 2016, now abandoned.

(60) Provisional application No. 62/198,645, filed on Jul. 29, 2015.

(30) Foreign Application Priority Data

Jun. 30, 2016 (TW) .................................. 105120683

(51) Int. Cl.
*H04N 5/33* (2006.01)
*H04N 5/225* (2006.01)
*G06K 9/00* (2006.01)

(52) U.S. Cl.
CPC .......... *G06K 9/00885* (2013.01); *H04N 5/33* (2013.01); *G06K 2009/00932* (2013.01); *H04N 5/2256* (2013.01)

(58) Field of Classification Search
CPC ..... G06K 2009/00932; G06K 9/00885; H04N 5/2256; H04N 5/33
See application file for complete search history.

(56) References Cited

U.S. PATENT DOCUMENTS

| | | | |
|---|---|---|---|
| 6,580,078 B1* | 6/2003 | O'Callaghan | G02F 1/141 250/351 |
| 7,705,835 B2* | 4/2010 | Eikman | G06F 3/0425 345/176 |
| 7,876,929 B2* | 1/2011 | Matsumura | G07C 9/37 382/115 |
| 8,692,875 B2* | 4/2014 | Watanabe | G06K 9/00382 348/77 |
| 9,100,493 B1* | 8/2015 | Zhou | G06Q 20/321 |
| 9,294,689 B2* | 3/2016 | Thorsted | H04N 5/30 |
| 9,360,682 B1* | 6/2016 | Edwards | G02B 23/18 |
| 9,672,405 B2* | 6/2017 | Lin | G06K 9/00033 |
| 9,773,169 B1* | 9/2017 | Fulmer | G06K 9/00604 |
| 9,824,272 B2* | 11/2017 | Choi | G06K 9/228 |
| 9,826,198 B2* | 11/2017 | Higuchi | A61B 5/1171 |
| 10,733,414 B2* | 8/2020 | Che | G06K 9/2018 |

(Continued)

*Primary Examiner* — Shaghayegh Azima

(74) *Attorney, Agent, or Firm* — JCIPRNET

(57) ABSTRACT

A biometric device includes a substrate, an image sensor, an optical layer and at least one infrared light emitting diode (IR LED). The image sensor is disposed on the substrate. The optical layer is disposed on the image sensor and includes a diffraction pattern. The IR LED is disposed on the diffraction pattern of the optical layer. The optical layer is located between the IR LED and the image sensor.

12 Claims, 12 Drawing Sheets

(56) References Cited

U.S. PATENT DOCUMENTS

| | | | |
|---|---|---|---|
| 2002/0053857 A1* | 5/2002 | Scott | G06K 9/0002 310/314 |
| 2003/0001459 A1* | 1/2003 | Scott | G06K 9/00885 310/339 |
| 2003/0090650 A1* | 5/2003 | Fujieda | G06K 9/0004 356/71 |
| 2003/0118219 A1* | 6/2003 | Higuchi | G06K 9/00046 382/125 |
| 2004/0179723 A1* | 9/2004 | Sano | G06K 9/00033 382/124 |
| 2004/0184732 A1* | 9/2004 | Zhou | G01J 3/0259 385/37 |
| 2005/0174015 A1* | 8/2005 | Scott | G06K 9/0002 310/334 |
| 2005/0194866 A1* | 9/2005 | Scott | G06K 9/0002 310/344 |
| 2006/0133651 A1* | 6/2006 | Polcha | G07C 9/37 382/115 |
| 2007/0040062 A1* | 2/2007 | Lau | F41G 3/147 244/3.16 |
| 2007/0201738 A1* | 8/2007 | Toda | H04N 5/33 382/144 |
| 2007/0206908 A1* | 9/2007 | Cohen | B29D 11/0075 385/92 |
| 2007/0253607 A1* | 11/2007 | Higuchi | G06K 9/0012 382/124 |
| 2008/0005578 A1* | 1/2008 | Shafir | G06K 9/00268 713/186 |
| 2008/0088731 A1* | 4/2008 | Tanaka | H04N 5/2256 348/340 |
| 2008/0107309 A1* | 5/2008 | Cerni | G06K 9/00033 382/115 |
| 2008/0232653 A1* | 9/2008 | Rowe | A61B 5/1172 382/124 |
| 2008/0252882 A1* | 10/2008 | Kesterson | G02B 5/208 356/300 |
| 2009/0161920 A1* | 6/2009 | Kan | G06K 9/0004 382/115 |
| 2009/0169071 A1* | 7/2009 | Bond | G06K 9/00919 382/124 |
| 2010/0067757 A1* | 3/2010 | Arai | G06K 9/0004 382/128 |
| 2010/0174914 A1* | 7/2010 | Shafir | G06K 9/00268 713/186 |
| 2010/0183199 A1* | 7/2010 | Smith | G06Q 50/24 382/117 |
| 2010/0208949 A1* | 8/2010 | Sato | G06K 9/00885 382/115 |
| 2010/0280504 A1* | 11/2010 | Manzke | A61B 18/24 606/11 |
| 2011/0299044 A1* | 12/2011 | Yeh | H04N 9/315 353/52 |
| 2012/0225514 A1* | 9/2012 | Wada | H01L 27/14683 438/65 |
| 2013/0033579 A1* | 2/2013 | Wajs | G06T 7/571 348/46 |
| 2013/0064514 A1* | 3/2013 | Peng | G11B 5/3133 385/124 |
| 2013/0070073 A1* | 3/2013 | Higuchi | H04N 7/18 348/77 |
| 2013/0136317 A1* | 5/2013 | Shinzaki | G06K 9/00 382/115 |
| 2013/0176109 A1* | 7/2013 | Higuchi | G06K 9/0004 340/5.83 |
| 2013/0265568 A1* | 10/2013 | Micheels | G01J 3/0216 356/51 |
| 2014/0071328 A1* | 3/2014 | Miesak | G03B 15/06 348/340 |
| 2014/0086459 A1* | 3/2014 | Pan | G06K 9/00892 382/124 |
| 2014/0091328 A1* | 4/2014 | Ishiguro | H01L 31/173 257/84 |
| 2014/0120876 A1* | 5/2014 | Shen | H04L 63/0861 455/411 |
| 2014/0185885 A1* | 7/2014 | Yamada | G06K 9/00899 382/124 |
| 2014/0218327 A1* | 8/2014 | Shi | G06F 3/041 345/174 |
| 2015/0036065 A1* | 2/2015 | Yousefpor | H04M 1/0266 349/12 |
| 2015/0062324 A1* | 3/2015 | Choi | G06K 9/209 348/78 |
| 2015/0069454 A1* | 3/2015 | Park | H01L 33/486 257/99 |
| 2015/0130917 A1* | 5/2015 | Mil'shtein | G06K 9/00033 348/77 |
| 2015/0215509 A1* | 7/2015 | Miesak | G06K 9/2018 348/135 |
| 2015/0269406 A1* | 9/2015 | Hama | G06T 5/00 382/124 |
| 2015/0270429 A1* | 9/2015 | Jiroku | H01L 27/14603 257/458 |
| 2015/0292884 A1* | 10/2015 | Fuchikami | G01C 3/08 348/135 |
| 2015/0347812 A1* | 12/2015 | Lin | G06K 9/00033 382/124 |
| 2015/0363629 A1* | 12/2015 | Lee | G06K 9/0002 345/173 |
| 2016/0019423 A1* | 1/2016 | Ortiz | G02B 27/017 345/633 |
| 2016/0034772 A1* | 2/2016 | Betensky | H04N 5/23229 382/124 |
| 2016/0041663 A1* | 2/2016 | Chen | G06F 3/044 345/174 |
| 2016/0088203 A1* | 3/2016 | Maeda | H04N 5/23229 382/115 |
| 2016/0282584 A1* | 9/2016 | Cui | G02B 9/14 |
| 2016/0328594 A1* | 11/2016 | Che | G06K 9/00087 |
| 2016/0328595 A1* | 11/2016 | Sun | H01L 27/1469 |
| 2017/0103257 A1* | 4/2017 | Kasin | G06K 9/00335 |
| 2017/0193295 A1* | 7/2017 | Kim | G06K 9/00604 |
| 2017/0371213 A1* | 12/2017 | Wang | G02F 1/136286 |
| 2019/0102595 A1* | 4/2019 | Lee | G06K 9/00067 |

* cited by examiner

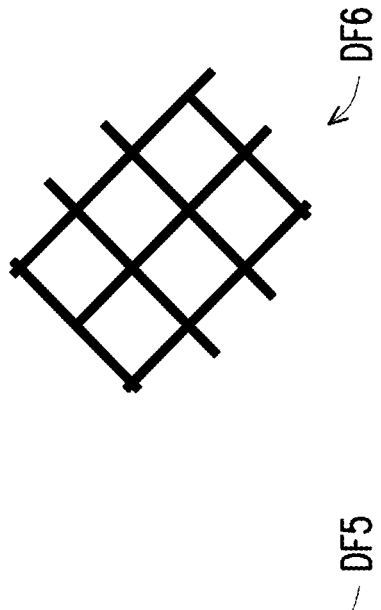
FIG. 2C
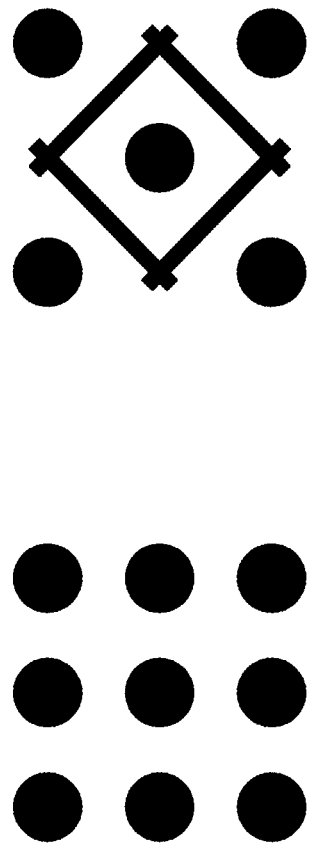
FIG. 2A
FIG. 2B
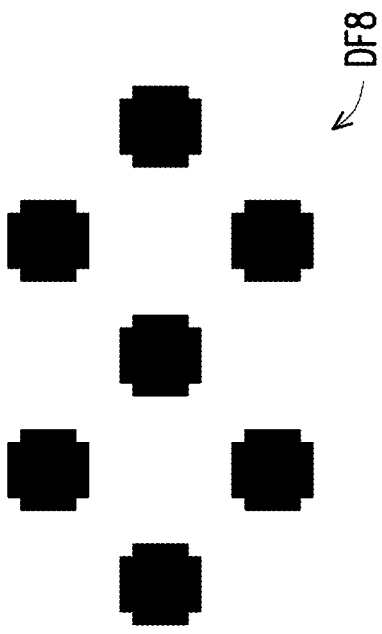
FIG. 2E
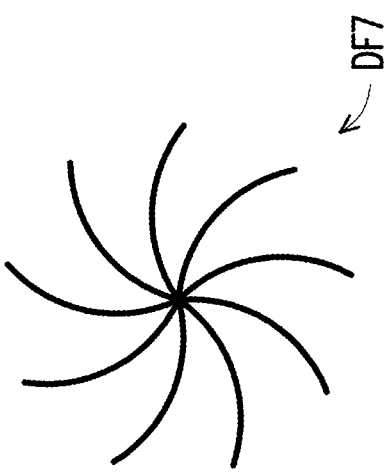
FIG. 2D

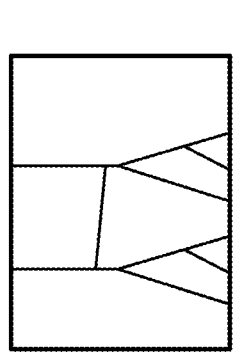
FIG. 10A
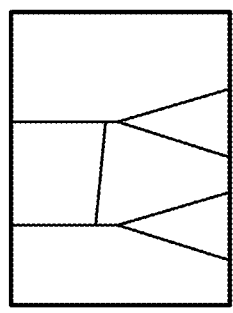
FIG. 10B
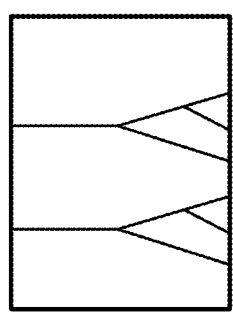
FIG. 10C
FIG. 10D
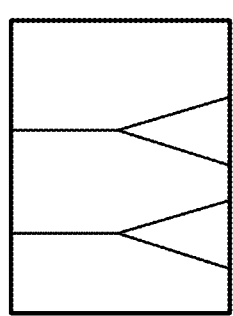
FIG. 10E
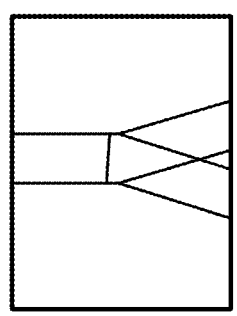
FIG. 10F
FIG. 10G
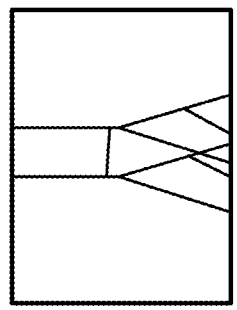
FIG. 10H

BIOMETRIC DEVICE AND METHOD THEREOF AND WEARABLE CARRIER

CROSS-REFERENCE TO RELATED APPLICATION

This application is a continuation application of and claims the priority benefit of a prior U.S. application Ser. No. 15/221,615, filed on Jul. 28, 2016, now pending. The prior U.S. application Ser. No. 15/221,615 claims the priority benefits of U.S. provisional application Ser. No. 62/198,645, filed on Jul. 29, 2015 and Taiwan application serial no. 105120683, filed on Jun. 30, 2016. The entirety of each of the above-mentioned patent applications is hereby incorporated by reference herein and made a part of this specification.

BACKGROUND OF THE DISCLOSURE

Field of the Disclosure

The disclosure relates to a recognition device and a method thereof, and particularly relates to a biometric device and a method thereof and a wearable carrier using the biometric device.

Description of Related Art

Biometrics plays a more and more important role in today's society, where types of the biometrics mainly include face recognition, iris recognition, vein recognition, fingerprint recognition, etc.

In terms of a current technique, solution for identity (ID) recognition on a smart wearable device is still not developed, and a reason thereof is that the wearable device generally requires a light and thin ID recognition system. Moreover, taking finger, palm vein recognition as an example, a vein image is generally captured first, and regarding the current technique, a data amount of the image is relatively large, a processing speed thereof is very slow, and power consumption of the whole image capturing operation is relatively large, which is not suitable for ID recognition of the smart wearable device. Therefore, how to design a biometric device with low power consumption, thinned modules and a fast processing speed has become an important technical challenge in design of the biometric device.

SUMMARY OF THE DISCLOSURE

The disclosure is directed to a biometric device, which adopts an optical layer to achieve a thinning effect.

The disclosure is directed to a biometric method, which is adapted to sequentially light infrared light emitting diodes to decrease a data amount and increase a processing speed.

The disclosure is directed to a wearable carrier, which has the aforementioned biometric device.

The disclosure provides a biometric device, which is adapted to recognize a biological characteristic of a region of a biological body. The biometric device includes a substrate, an image sensor, an optical layer and at least one infrared light emitting diode (IR LED). The image sensor is disposed on the substrate. The optical layer is disposed on the image sensor and includes a diffraction pattern. The IR LED is disposed on the diffraction pattern of the optical layer, where and the optical layer is located between the IR LED and the image sensor.

The disclosure provides a biometric device, which is adapted to recognize a biological characteristic of a region of a biological body. The biometric device includes a substrate, an image sensor, a plurality of infrared light emitting diodes (IR LEDs) and an optical layer. The image sensor is disposed on the substrate and includes a plurality of photosensing units. The IR LEDs are disposed on the substrate, where the IR LEDs and the photosensing units are arranged in interleaving. The optical layer includes a plurality of lens portions, where the lens portions are aligned to a part of the photosensing units, an orthogonal projection of each of the lens portions on the substrate is overlapped with an orthogonal projection of the corresponding photosensing unit on the substrate.

The disclosure provides a wearable carrier, which is adapted to be worn on a user. The wearable carrier includes a display unit, a strip unit and a biometric device. The strip unit is connected to the display unit at a first edge and a second edge opposite to each other. The biometric device is disposed on the display unit or the strip unit for recognizing a biological characteristic of a region of a biological body. The biometric device includes a substrate, an image sensor, an optical layer and at least one infrared light emitting diode (IR LED). The image sensor is disposed on the substrate. The optical layer is disposed on the image sensor and includes a diffraction pattern. The IR LED is disposed on the diffraction pattern of the optical layer, where the IR LED is located between the region of the biological body and the image sensor, and the optical layer is located between the IR LED and the image sensor.

The disclosure provides a wearable carrier, which is adapted to be worn on a user. The wearable carrier includes a display unit, a strip unit and a biometric device. The strip unit is connected to the display unit at a first edge and a second edge opposite to each other. The biometric device is disposed on the display unit or the strip unit for recognizing a biological characteristic of a region of a biological body. The biometric device includes a substrate, an image sensor, a plurality of infrared light emitting diodes (IR LEDs) and an optical layer. The image sensor is disposed on the substrate and includes a plurality of photosensing units. The IR LEDs are disposed on the substrate, where the IR LEDs and the photosensing units are arranged in interleaving. The optical layer includes a plurality of lens portions, where the lens portions are aligned to a part of the photosensing units, an orthogonal projection of each of the lens portions on the substrate is overlapped with an orthogonal projection of the corresponding photosensing unit on the substrate, and the lens portion is located between the region of the biological body and the corresponding photosensing unit.

The disclosure provides a biometric method including following steps. A characteristic image data is received. A region of a biological body is coupled to a biometric device, where the biometric device includes a plurality of photosensing units and a plurality of infrared light emitting diodes (IR LEDs), and the photosensing units are disposed corresponding to the IR LEDs, and each of the IR LEDs is adapted to emit a light to the region of the biological body. At least a part of the IR LEDs is sequentially lighted and the corresponding photosensing units are sequentially turned on, and the corresponding photosensing units receive the lights scattered by the region to respectively generate a recognition sensing image. The recognition sensing image is compared with the characteristic image data, and a recognition result is output according to a comparison result.

According to the above description, since the biometric device of an embodiment of the disclosure adopts the design of the optical layer to replace the conventional optical module with a large volume, the biometric device of the disclosure has an advantage of thinning tendency. Moreover, in the biometric device of another embodiment of the disclosure, the optical layer thereof has the lens portion, such that the biometric device may provide a planar light source to decrease intensity and power consumption of the IR LEDs may in subsequent recognition illumination. In addition, since the biometric method of the disclosure adopts a method of sequentially lighting the IR LEDs, the amount of data processed by the image sensor is decreased, such that an image processing speed is accelerated to quickly obtain a recognition result.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIGS. 2A-2E are schematic diagrams of diffraction figures of a plurality of different embodiments in the optical layer.

FIGS. 10A-10H are enlarged views of a region A to a region H in FIG. 9.

DESCRIPTION OF EMBODIMENTS

Figure 1A:
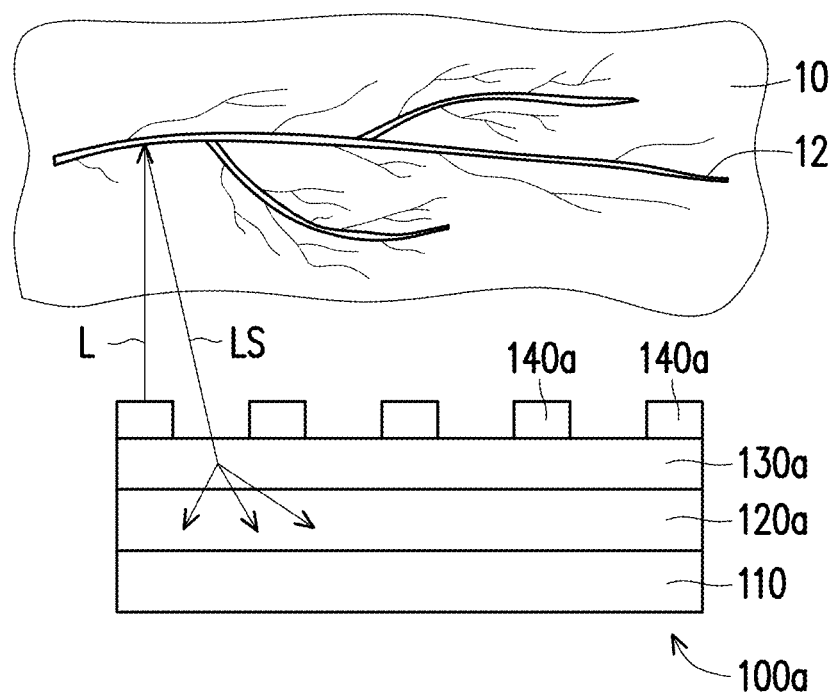
FIG. 1A is a cross-sectional view of a biometric device according to an embodiment of the disclosure.
Figure 1B:
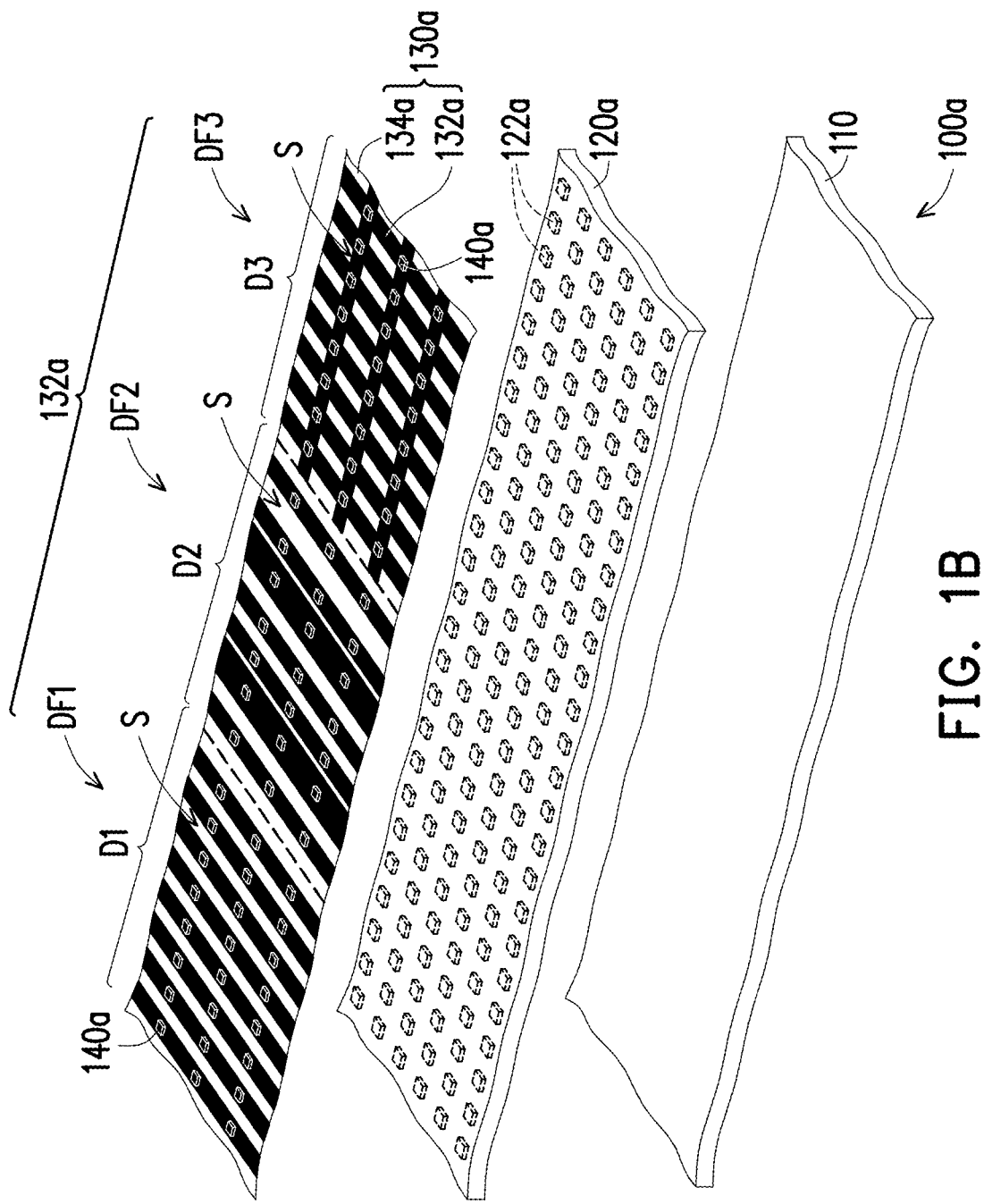
FIG. 1B is a partial top view of an exploded schematic diagram of the biometric device of FIG. 1A.

FIG. 1A is a cross-sectional view of a biometric device according to an embodiment of the disclosure. FIG. 1B is a partial top view of an exploded schematic diagram of the biometric device of FIG. 1A. Referring to FIG. 1A and FIG. 1B, in the present embodiment, the biometric device 100a is adapted to recognize a biological characteristic of a region 12 of a biological body 10, where the region 12 of the biological body 10 is, for example, a wrist of a human body, and the biological characteristic is, for example, a vein network image characteristic. The biometric device 100a includes a substrate 110, an image sensor 120a, an optical layer 130a and at least one infrared light emitting diode (IR LED) 140a (in FIG. 1A and FIG. 1B, a plurality of IR LEDs is schematically illustrated). The image sensor 120a is disposed on the substrate 110. The optical layer 130a is disposed on the image sensor 120a and includes a diffraction pattern 132a. The IR LEDs 140a are disposed on the diffraction pattern 132a of the optical layer 130a, where the IR LEDs 140a are located between the region 12 of the biological body 10 and the image sensor 120a, and the optical layer 130a is located between the IR LEDs 140a and the image sensor 120a.

In detail, the image sensor 120a includes a plurality of photosensing units 122a, where the photosensing units 122a are arranged in an array. The optical layer 130a further includes a transparent substrate 134a, and the diffraction pattern 132a is disposed on the transparent substrate 134a to define a plurality of slits S. As shown in FIG. 1B, the transparent substrate 134a of the optical layer 130a of the present embodiment can be divided into a plurality of blocks, for example, blocks D1, D2, D3, and each block D1 (or the block D2, the block D3) is configured with a diffraction figure DF1 (or a diffraction figure DF2, a diffraction figure DF3), and the diffraction figures DF1, DF2, DF3 define the diffraction pattern 132a. The diffraction figure DF1 in the block D1, for example, comprises a plurality of line images of the same size, and the diffraction figure DF2 in the block D2, for example, comprises a plurality of line images with different widths, and the diffraction figure DF3 in the block D3, for example, comprises a plurality of line images of the same size, and the line images are intersected with each other to form a grid, though the disclosure is not limited thereto. For example, the shape of the diffraction figure can be any shape of diffraction figures DF4-DF8 shown in FIG. 2A-FIG. 2E or other shapes, which is not limited by the disclosure. It should be noted that the transparent substrate 134a of the optical layer 130a can be divided into the required number of blocks according to an actual requirement, and these blocks can be respectively configured with the required diffraction figure to define the diffraction pattern 132a of different types.

Since the diffraction pattern 132a is an opaque pattern and is disposed on the transparent substrate 134a, the slits S are defined on the transparent substrate 134a (i.e. the region without the diffraction pattern 132a). The IR LEDs 140a are disposed on the diffraction pattern 132a, i.e. a light L emitted by the IR LED 140a does not enter the optical layer 130a from the position where the IR LED 140a is located, but is incident to the region 12 of the biological body 10, and is scattered by the region 12 of the biological body 10 to form a scattered light LS, and the scattered light LS enters the optical layer 130a. Then, the scattered light LS passes through the slits S to produce a diffraction effect for imaging, and the image sensor 120a receives the scattered light LS, and obtains a recognition result after image processing and image analysis and comparison.

Since the optical layer 130a of the present embodiment is embodied as a single layer type optical layer, compared to the conventional optical module consisting of multilayer of lenses, the optical layer 130a of the present embodiment may have a thinner volume. Therefore, the biometric device 100a of the present embodiment adopts the optical layer 130a to replace the conventional large-volume optical modules, by which the whole volume and thickness can be greatly decreased to cope with a thinning tendency.

It should be noticed that reference numbers of the components and a part of contents of the aforementioned embodiment are also used in the following embodiment, wherein the same reference numbers denote the same or like components, and descriptions of the same technical contents are omitted. The aforementioned embodiment can be referred for descriptions of the omitted parts, and detailed descriptions thereof are not repeated in the following embodiment.

Figure 3A:
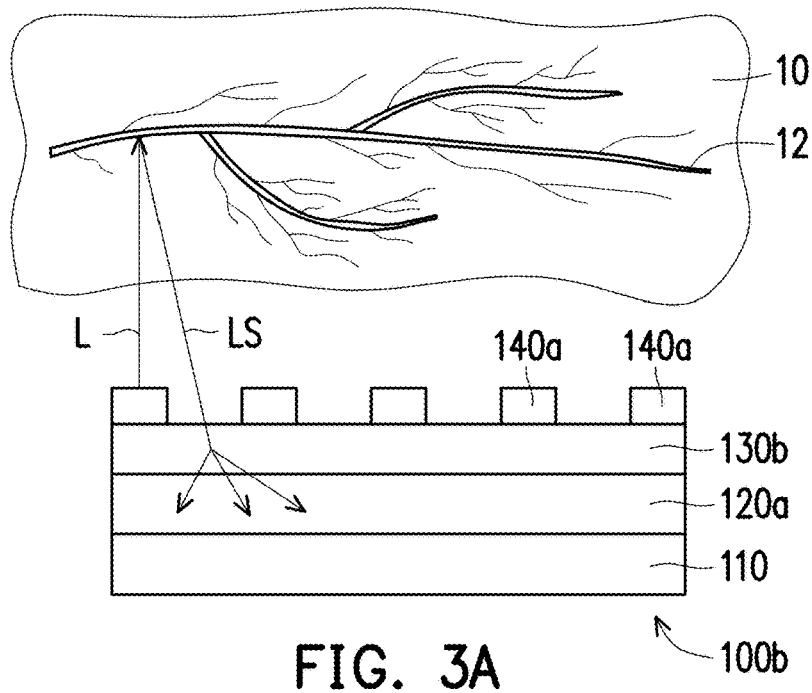
FIG. 3A is a cross-sectional view of a biometric device according to another embodiment of the disclosure.
Figure 3B:
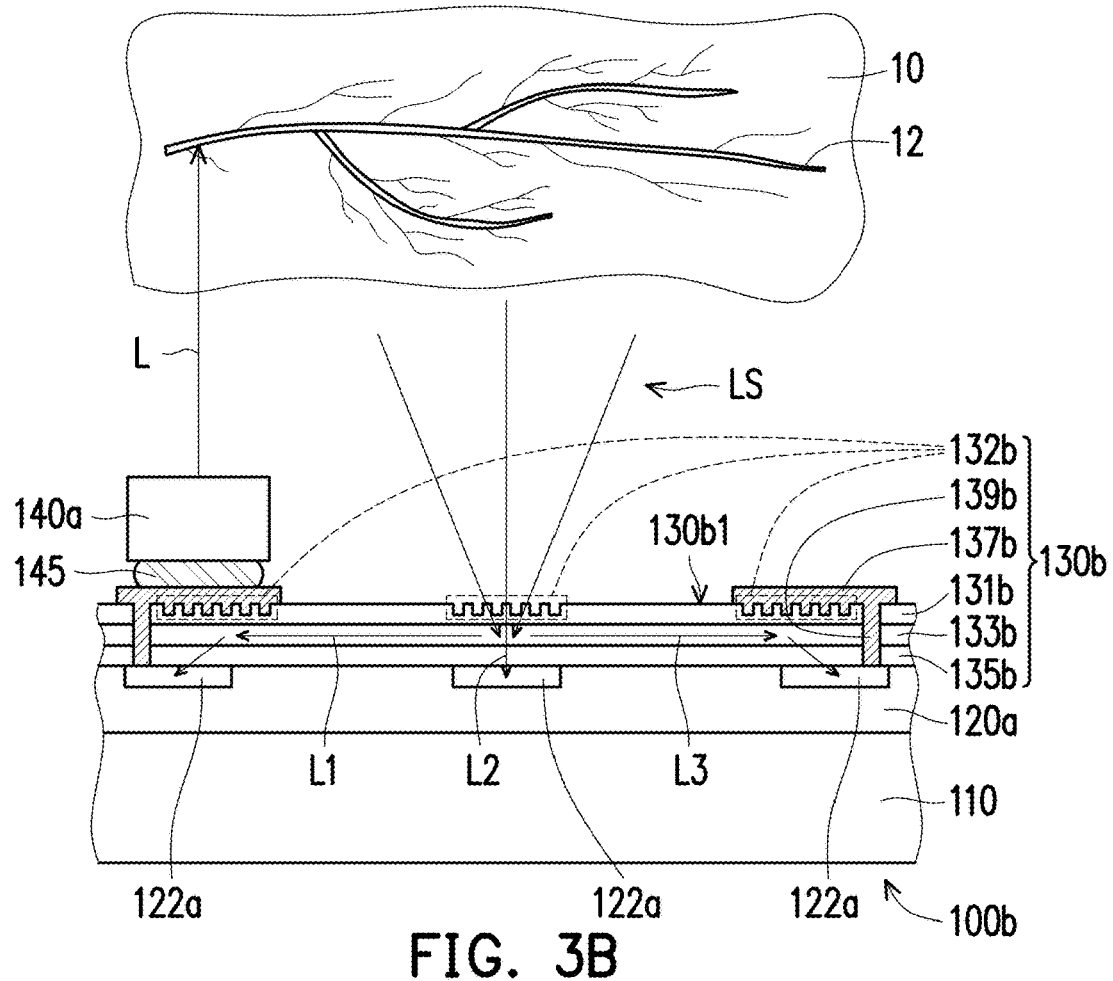
FIG. 3B is a partial enlarged cross-sectional view of the biometric device of FIG. 3A.

FIG. 3A is a cross-sectional view of a biometric device according to another embodiment of the disclosure. FIG. 3B is a partial enlarged cross-sectional view of the biometric device of FIG. 3A. Referring to FIG. 3A and FIG. 3B, the biometric device 100b of the present embodiment is similar to the biometric device 100a of FIG. 1A and FIG. 1B, and a main difference there between is that the structure of the optical layer 130b of the present embodiment is different to the structure of the optical layer 130a of the aforementioned embodiment. In detail, the optical layer 130b of the present embodiment further includes a first silicon oxide layer 131b, a silicon nitride layer 133b and a second silicon oxide layer 135b. The silicon nitride layer 133b is located between the first silicon oxide layer 131b and the second silicon oxide layer 135b, and the diffraction pattern 132b is located in partial region of an upper surface 130b1 of the first silicon oxide layer 131b, and the second silicon oxide layer 135b is located between the silicon nitride layer 133b and the image sensor 120a. Moreover, the optical layer 130b of the present embodiment further includes a metal layer 137b and at least one conductive through hole 139b. The metal layer 137b is disposed on the upper surface 130b1 of the first silicon oxide layer 131b and covers a part of the diffraction pattern 132b. The conductive through hole 139b is electrically connected between the metal layer 137b and the image sensor 120a, and the IR LED 140a is electrically connected to image sensor 120a through the metal layer 137b and the conductive through hole 139b, where the metal layer 137b can also be replaced by a conductive light-shielding material.

As shown in FIG. 3B, the IR LED 140a can be electrically connected to the metal layer 137b through a conductive bump 145. The light L emitted by the IR LED 140a is incident to the region 12 of the biological body 10, and is scattered by the region 12 of the biological body 10 to form the scattered light LS, and the scattered light LS enters the optical layer 130b. Then, the scattered light LS passes through the diffraction pattern 132b to generate diffracted lights L1, L2, L3 of different orders, and the diffracted lights L1, L2, L3 of different orders are diffracted towards different directions and are received by the photosensing units 122a of the image sensor 120a, and then a recognition result is obtained after image processing and image analysis and comparison.

Figure 4A:
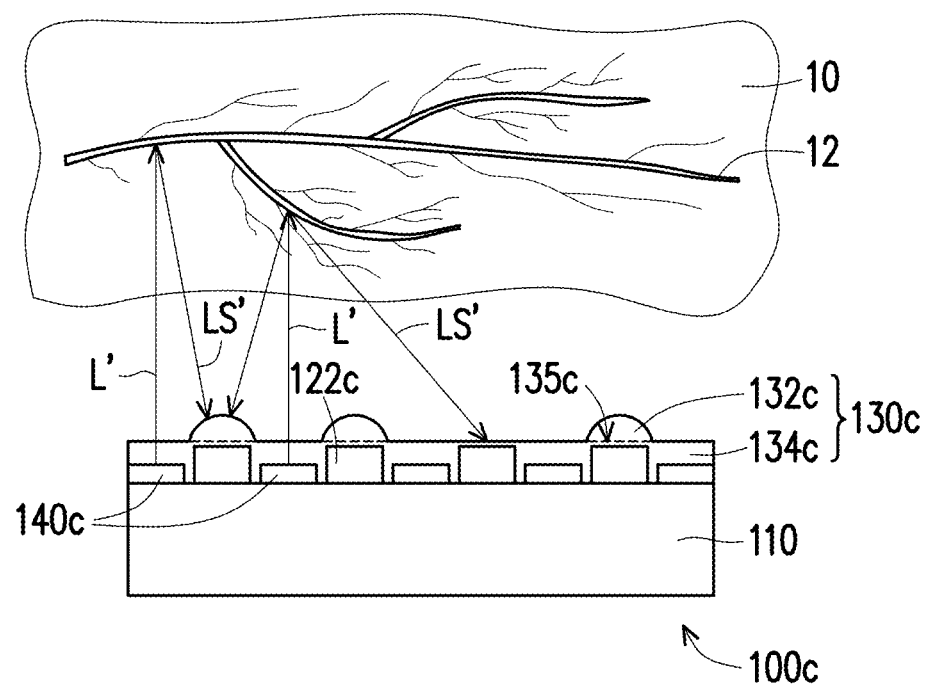
FIG. 4A is a cross-sectional view of a biometric device according to an embodiment of the disclosure.
Figure 4B:
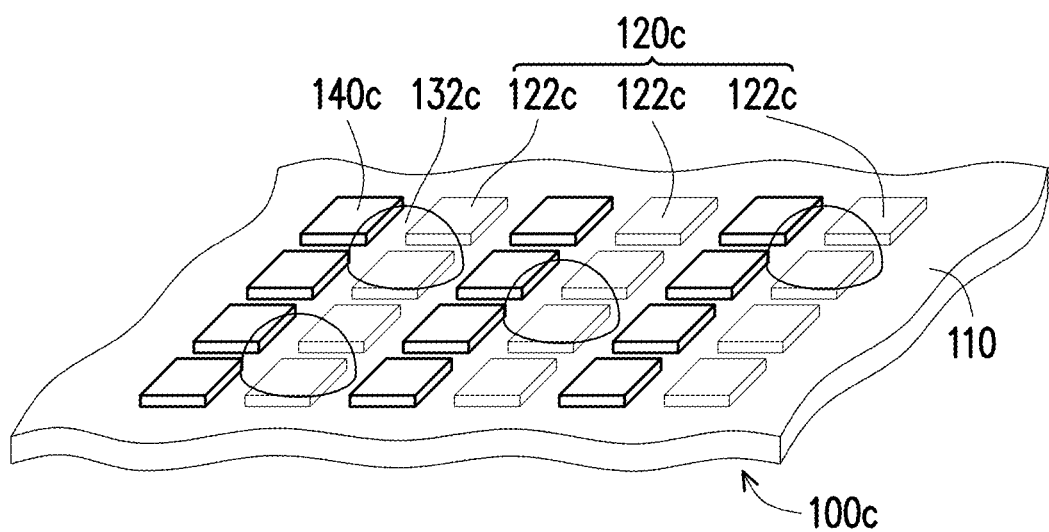
FIG. 4B is a partial top view of the biometric device of FIG. 4A.

FIG. 4A is a cross-sectional view of a biometric device according to an embodiment of the disclosure. FIG. 4B is a partial top view of the biometric device of FIG. 4A. For simplicity's sake, a part of the components is omitted in FIG. 4B. Referring to FIG. 4A and FIG. 4B, the biometric device 100c of the present embodiment is similar to the biometric device 100a of FIG. 1A and FIG. 1B, and a main difference there between is that the IR LEDs 140c and the photosensing units 122c are arranged in interleaving. The optical layer 130c includes a plurality of lens portions 132c and a transparent panel portion 134c, where the transparent panel portion 134c covers the IR LEDs 140c and the photosensing units 122c, and the lens portions 132c are disposed on a top surface 135c of the transparent panel portion 134c and are aligned to a part of the photosensing units 122c. An orthogonal projection of each of the lens portions 132c on the substrate 110 is overlapped with an orthogonal projection of the corresponding photosensing unit 122c on the substrate 110, and the lens portion 132c is located between the region 12 of the biological body 10 and the corresponding photosensing unit 122c. Namely, the number of the lens portions 132c is less than the number of the photosensing units 122c, and the lens portions 132c may cover a part of the photosensing units 122c.

To be specific, the photosensing units 122c of the present embodiment and the IR LEDs 140c are, for example, (but not limited to be) located on a same horizontal plane. Moreover, in the present embodiment, a height of the photosensing unit 122c is, for example, greater than a height of the IR LED 140c, though the disclosure is not limited thereto.

As shown in FIG. 4A, a light LS' emitted by the IR LED 140c is incident to the region 12 of the biological body 10, and is scattered by the region 12 of the biological body 10 to form the scattered light LS', and the scattered light LS' enters the optical layer 130c. Then, a part of the scattered light LS' passes through the lens portions 132c and is received by the photosensing units 122c under the lens portions 132c, and the other part of the scattered light LS' is directly received by the photosensing units 122c uncovered by the lens portions 132c. Then, image processing is performed to process the lights passing through the lens portions 132c and the lights without passing through the lens portion 132c that are sensed by the photosensing units 122c, and after comparison and analysis, a vein image is obtained. Herein, the vein image is a biological characteristic of a user, and a vein image database comprises a plurality of vein images.

Since the optical layer 130c of the present embodiment is embodied as a single layer type optical layer, compared to the conventional optical module consisting of multilayer of lenses, the optical layer 130a of the present embodiment may have a thinner volume. Therefore, the whole volume and thickness can be greatly decreased to cope with the thinning tendency. Moreover, in the present embodiment, the IR LEDs are arranged in an array to provide a planar light source. In this way, the intensity and power consumption of the IR LEDs 140 can be effectively decreased in subsequent recognition illumination.

Figure 4C:
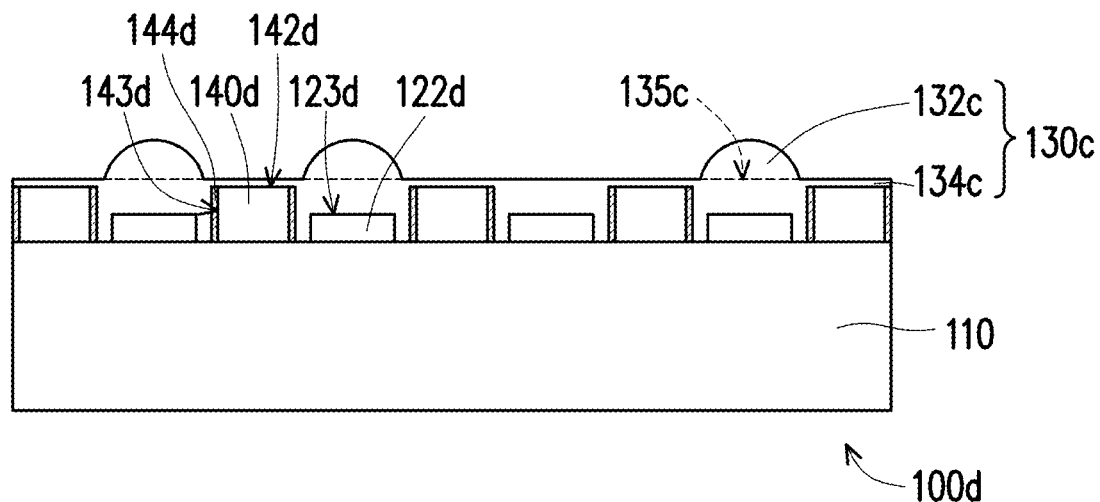
FIG. 4C is a cross-sectional view of a biometric device according to another embodiment of the disclosure.

FIG. 4C is a cross-sectional view of a biometric device according to another embodiment of the disclosure. Referring to FIG. 4C, the biometric device 100d of the present embodiment is similar to the biometric device 100c of FIG. 4A, and a main difference there between is that a height of a first upper surface 142d of the IR LED 140d is higher than a height of a second upper surface 123d of the photosensing unit 122d. Namely, the height of the IR LED 140d of the present embodiment is higher than the height of the photosensing unit 122d. Since the height of the IR LED 140d of the present embodiment is higher than the height of the photosensing unit 122d, in order to avoid a situation that the photosensing unit 122d receives a lateral light of the IR LED 140d, a surrounding surface 143d of the IR LED 140d of the present embodiment has a reflective material layer 144d, where reflectivity of the reflective material layer 144d is, for example, greater than 70%, and a material of the reflective material layer 144d is, for example, gold, silver, aluminium, though the disclosure is not limited thereto. The reflective material layer 144*d* is configured to reflect the lateral light of the IR LED 140*d* for emitting in a normal direction.

Figure 4D:
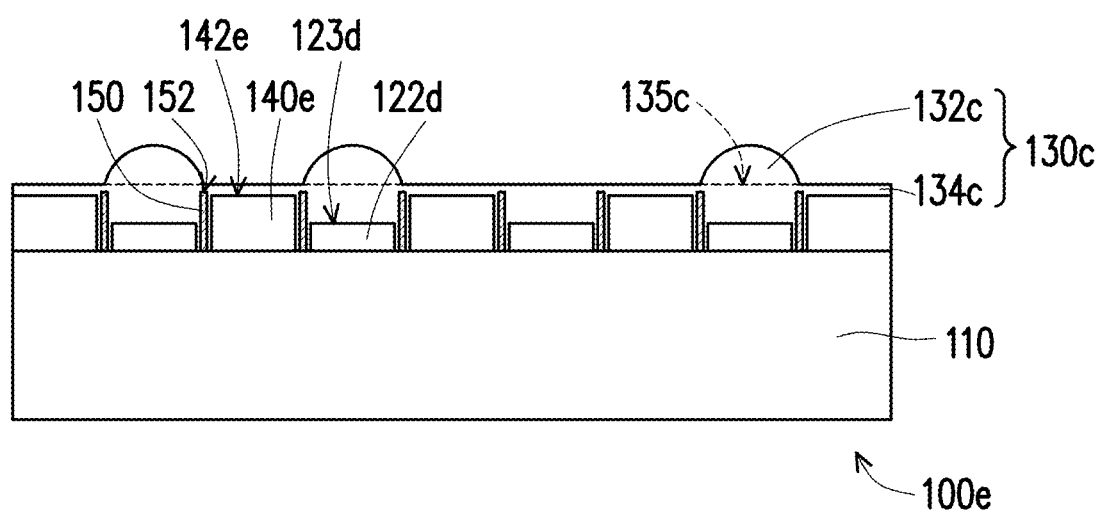
FIG. 4D is a cross-sectional view of a biometric device according to another embodiment of the disclosure.

Certainly, in other embodiments, different structure designs can be adopted to prevent the lateral light of the IR LED 140*d* from entering the photosensing unit 122*d*. Referring to FIG. 4D, the biometric device 100*e* of the present embodiment is similar to the biometric device 100*d* of FIG. 4C, and a main difference there between is that the biometric device 100*e* of the present embodiment further includes a plurality of wall structures 150. The wall structures 150 are disposed on the substrate 110 and surround each of the IR LEDs 140*e*, where each of the wall structures 150 has a third upper surface 152, and the third upper surface 152 is higher than the first upper surface 142*e*. The wall structures 150 may change the lateral light of the IR LED 140*e* from a lateral transmission direction into an upward transmission direction, such that the light transmitted in the lateral manner can be effectively used.

Figure 5:
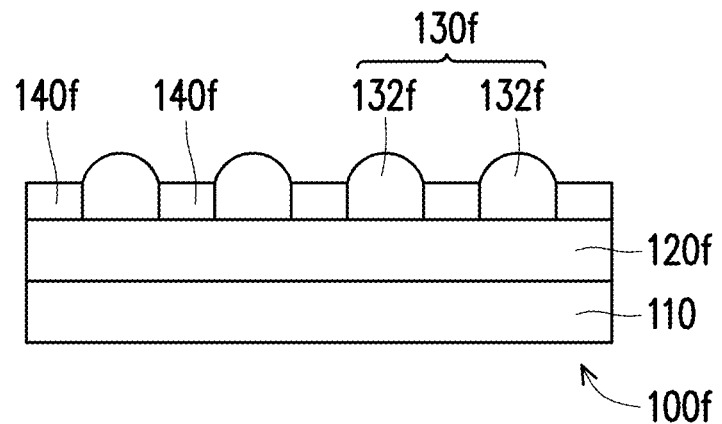
FIG. 5 is a cross-sectional view of a biometric device according to another embodiment of the disclosure.

FIG. 5 is a cross-sectional view of a biometric device according to another embodiment of the disclosure. Referring to FIG. 5, the biometric device 100*f* of the present embodiment is similar to the biometric device 100*c* of FIG. 4A, and a main difference there between is that the IR LEDs 140*f* and the photosensing units are not arranged in interleaving. To be specific, similar to the embodiment of FIG. 1A where the image sensor 120*a* is disposed on the substrate 110, and the optical layer 130*a* and the IR LEDs 140*a* are disposed on the image sensor 120*a*, in the present embodiment, the image sensor 120*f* is disposed on the substrate 110, and the IR LEDs 140*f*, the optical layer 130*f* and the lens portions 132*f* thereof are disposed on the image sensor 120*f*.

Figure 6:
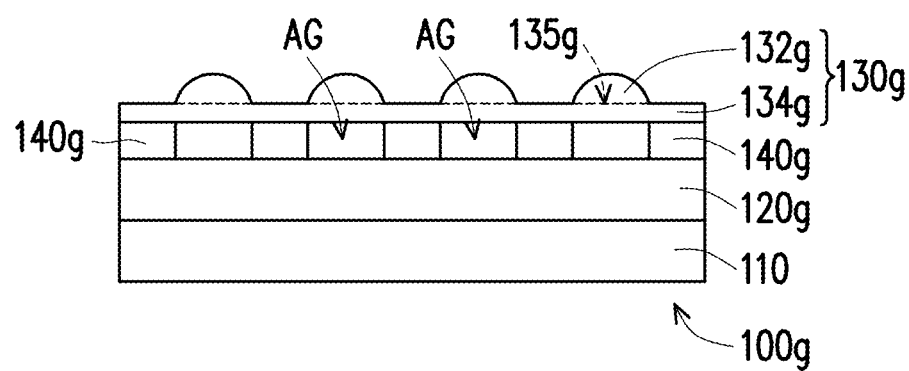
FIG. 6 is a cross-sectional view of a biometric device according to another embodiment of the disclosure.

FIG. 6 is a cross-sectional view of a biometric device according to another embodiment of the disclosure. Referring to FIG. 6, the biometric device 100*g* of the present embodiment is similar to the biometric device 100*f* of FIG. 5, and a main difference there between is that the optical layer 130*g* of the present embodiment further includes a transparent panel portion 134*g*, where the transparent panel portion 134*g* is disposed on the IR LEDs 140*g*, and the transparent panel portion 134*g*, the IR LEDs 140*g* and the image sensor 120*g* define a plurality of air gaps AG. The air gaps AG are located between the IR LEDs 140*g*, and the lens portions 132*g* are located on a top surface 135*g* of the transparent panel portion 134*g*.

Figure 7:
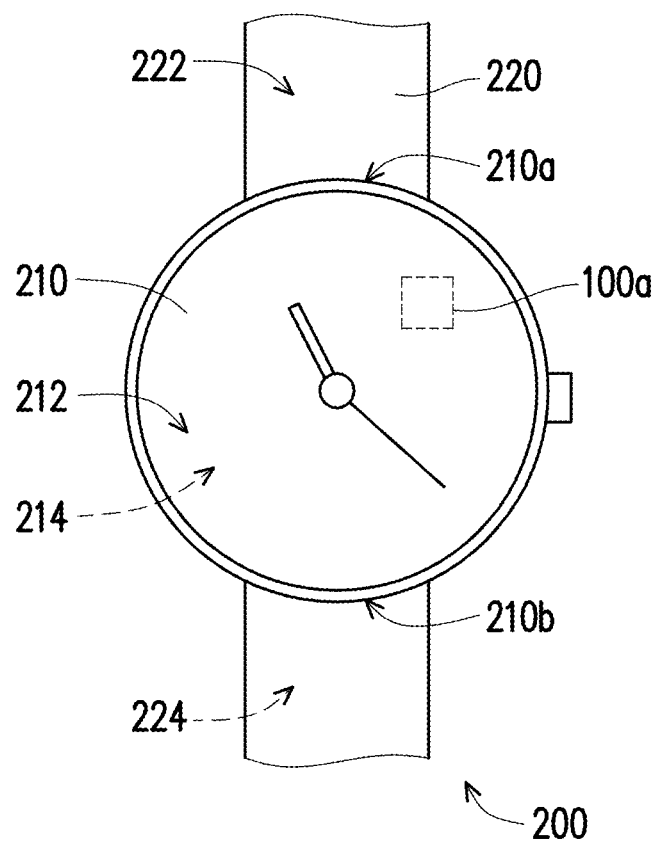
FIG. 7 is a schematic diagram of a wearable carrier according to an embodiment of the disclosure.

FIG. 7 is a schematic diagram of a wearable carrier according to an embodiment of the disclosure. Referring to FIG. 7, the wearable carrier 200 of the present embodiment is adapted to be worn on a user. The wearable carrier 200 includes a display unit 210, a strip unit 220 and one of the aforementioned biometric devices 100*a*~100*h*. As shown in FIG. 7, the wearable carrier 200 is embodied by a watch, though the disclosure is not limited thereto. In other embodiments that are not shown, a sport bracelet or other types of wearable carrier is also applicable.

In detail, the display unit 210 of the present embodiment may, for example, display time information, where the display unit 210 has a first edge 210*a* and a second edge 210*b* opposite to each other and a display surface 212 and a back surface 214 opposite to each other. The strip unit 220 is connected to the first edge 210*a* and the second edge 210*b* of the display unit 210, and is adapted to be fixed on a wrist of the user, though the disclosure is not limited thereto. The biometric device 100*a* (or the biometric devices 100*b*~100*h*) can be configured on the display surface 212 of the display unit 210. Certainly, in other embodiments that are not shown, the biometric device 100*a* (or the biometric devices 100*b*~100*h*) can also be disposed on the back surface 214 of the display unit 210, or on an outer surface 222 of the strip unit 220, or on an inner surface 224 of the strip unit 220.

Since the biometric device 100*a* (or the biometric devices 100*b*~100*h*) adopts the optical layer 130*a* (or 130*b*, 130*c*, 130*f*, 130*g*) to replace the conventional optical module consisting of multilayer of lenses, the surface of the optical layer is similar to a planar optical layer, such that the biometric device 100*a* (or the biometric devices 100*b*~100*h*) of the present embodiment have an advantage of thinning tendency. When the biometric device 100*a* (or the biometric devices 100*b*~100*h*) is integrated with the wearable device to form a wearable carrier 200, besides that the wearable carrier 200 has the original functions (for example, a time display function), it also has a biometric function, which satisfies user's appeal for multi-function on products.

Figure 8:
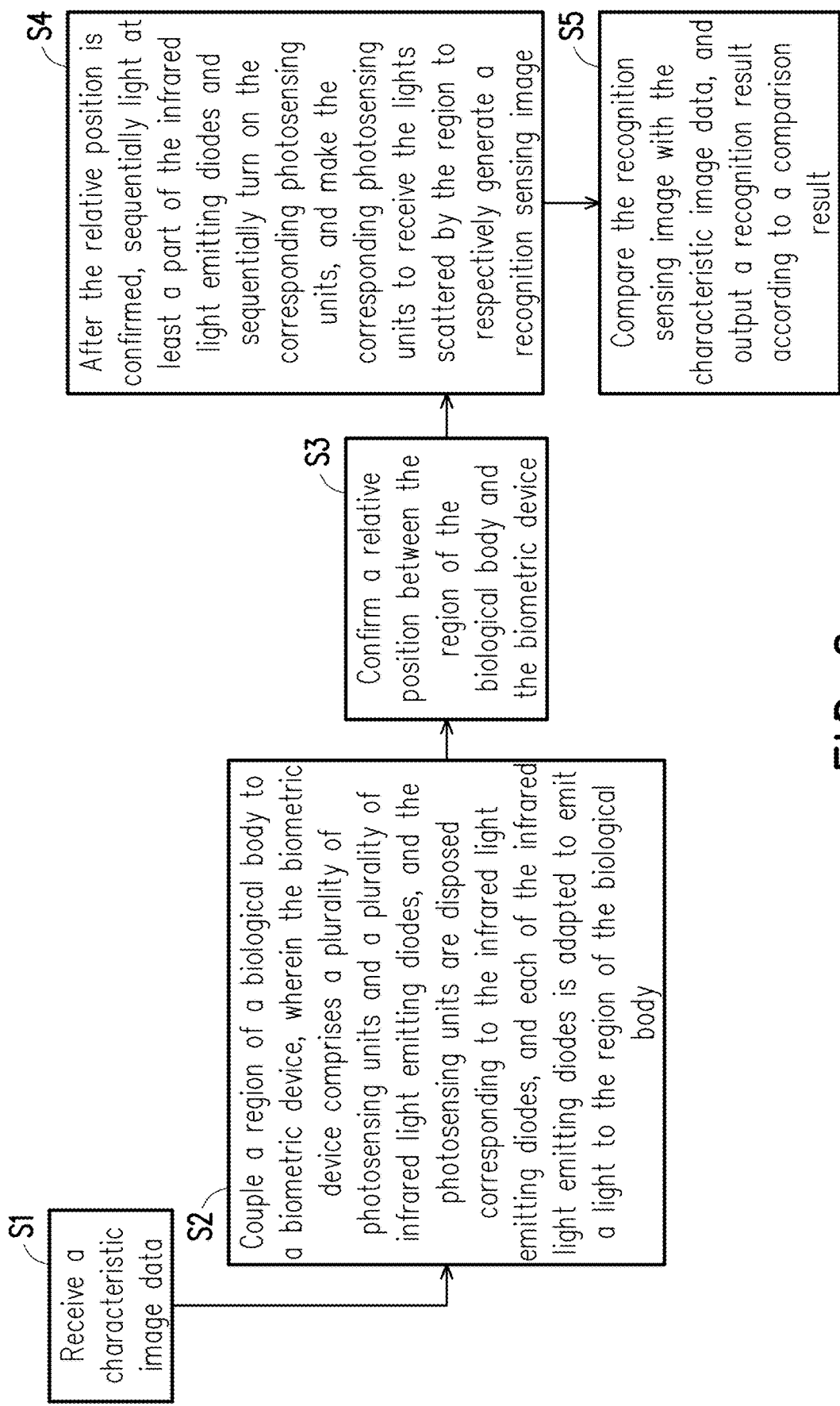
FIG. 8 is a flowchart illustrating a biometric method according to an embodiment of the disclosure.
Figure 9:
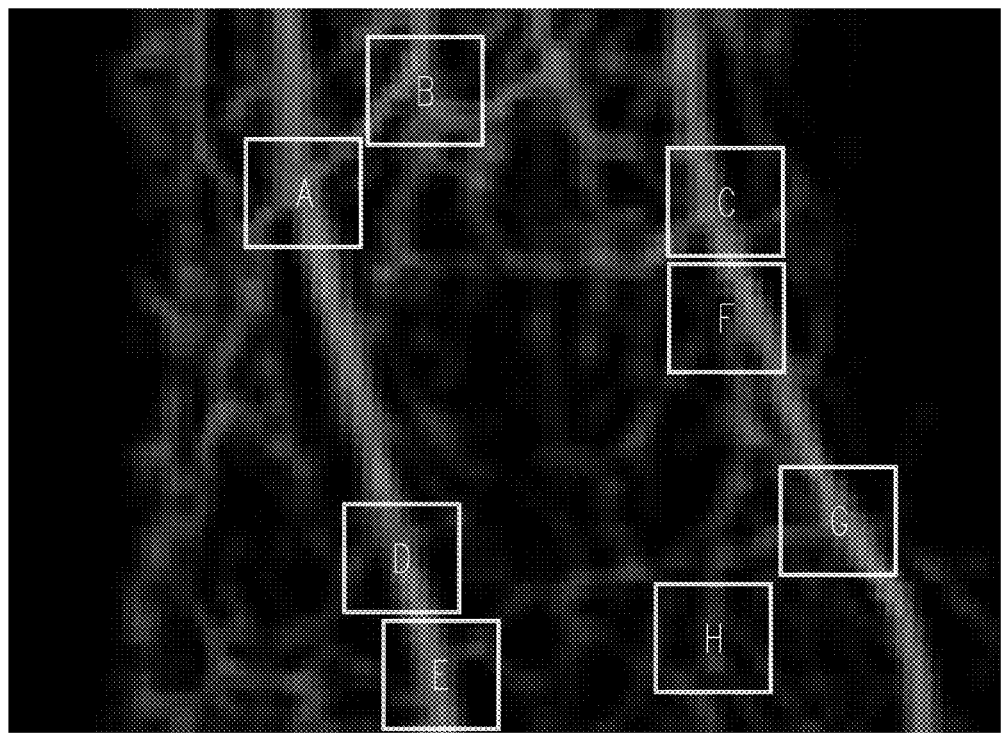
FIG. 9 is a schematic diagram of a biological characteristic of a region of a biological body.

FIG. 8 is a flowchart illustrating a biometric method according to an embodiment of the disclosure. FIG. 9 is a schematic diagram of a biological characteristic of a region of a biological body. FIGS. 10A-10H are enlarged views of a region A to a region H in FIG. 9. Referring to FIG. 8, the biometric method of the present embodiment includes following steps. First, in step S1, a biological characteristic of a user is registered, and a characteristic image data is received in a first use and is stored in the device to serve as a comparison reference. Establishment of the characteristic image data is, for example, to capture an image of the region 12 of the biological body 10, for example, capture an image of the vein, and then referring to FIG. 9, regions corresponding to the characteristic image (for example, the region A to the region H in FIG. 9) are extracted to store a structure characteristic of the characteristic image and related position data to form the characteristic image data. Selection of the characteristic image data is, for example, bifurcations of blood vessels, and referring to FIG. 10A to FIG. 10H for schematic diagrams of bifurcations of blood vessels in the region A to the region H.

Then, referring to FIG. 8 and FIG. 1A, in step S2, the region 12 of the biological body 10 is coupled to the biometric device 100*a*, where the biometric device 100*a* includes a plurality of photosensing units 122*a* and a plurality of IR LEDs 140*a*, the photosensing units 122*a* are disposed corresponding to the IR LEDs 140*a*, and each of the IR LEDs 140*a* is adapted to emit a light L to the region 12 of the biological body 10.

Then, referring to FIG. 8 and FIG. 1A, in step S3, a relative position between the region 12 of the biological body 10 and the biometric device 100*a* is confirmed, and a method for confirming the relative position is described as follow. First, one or a plurality of IR LEDs 140*a* is lighted and the corresponding photosensing unit 122*a* are turned on, such that the photosensing units 122*a* receive the light LS scattered by the region 12 to generate a positioning sensing image. The corresponding photosensing unit 122*a* is turned on at the same time while, before or after one of the IR LEDs 140*a* is lighted, which is not limited by the disclosure. Then, the positioning sensing image is compared with the characteristic image data to confirm the relative position between the region 12 of the biological body 10 and the biometric device 100*a*. If the positioning sensing image is not complied with the characteristic image data, the flow returns to the step S2 to re-couple the region 12 of the biological body 10 and the biometric device 100*a* to adjust the relative position between the region 12 of the biological body 10 and the biometric device 100*a*. In other embodiments, other proper methods can be adopted to confirm the relative position, which is not limited by the disclosure.

Then referring to FIG. 8 and FIG. 1A, in step S4, after the relative position is confirmed, at least a part of the IR LEDs 140a are sequentially lighted and the corresponding photosensing units 122 are sequentially turned on, such that the corresponding photosensing units 122 receive the light LS to respectively generate a recognition sensing image. The corresponding photosensing units 122a are turned on at the same time while, before or after the unlighted IR LEDs 140a are sequentially lighted, which is not limited by the disclosure.

In detail, a method for sequentially lighting the IR LEDs 140a is, for example, to only light a single IR LED 140a at each time point, i.e. when one of the IR LEDs 140a is lighted, the other IR LEDs 140a are all turned off, though the disclosure is not limited thereto.

Finally, referring to FIG. 8, in step S5, the recognition sensing image is compared with the characteristic image data to output a recognition result according to a comparison result. In the present embodiment, since a method of sequentially lighting the IR LEDs 140a is adopted to decrease an amount of data processed by the image sensor 120a, an image processing speed is accelerated to quickly obtain a recognition result.

Certainly, the biometric device 100a adopted in the aforementioned biometric method is only an example, and those skilled in the art may select to use the biometric devices 100b-100h of the aforementioned embodiments according to an actual requirement. If the biometric device 100c of FIG. 4A is used, since the optical layer 130c of the biometric device 100c has the lens portions 132c, the biometric device 100c may provide a planar light source to decrease intensity and power consumption of the IR LEDs 140c required in recognition illumination.

Figure 11:
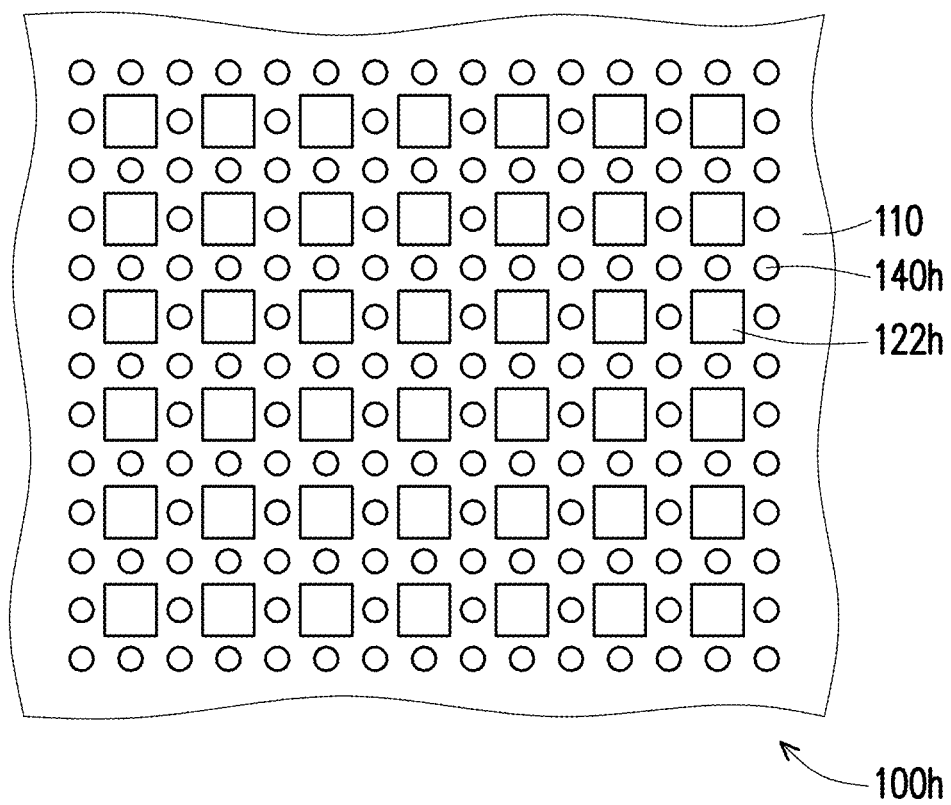
FIG. 11 is a partial top view of a biometric device according to another embodiment of the disclosure.

FIG. 11 is a partial top view of a biometric device according to another embodiment of the disclosure. Referring to FIG. 11, the biometric device 100h of the present embodiment is similar to the biometric device 100c of FIG. 4B, and a main difference there between is that the substrate 110 of the biometric device 100h is configured with more number of the IR LEDs 140h, where each of the photosensing unit 122h is surrounded by a plurality of the IR LEDs 140h, and the light emitted by each of the IR LEDs 140h is scattered by the region of the biological body to form the scattered light, and the scattered light is sensed by one or a plurality of the photosensing units 122h.

According to actual requirements, technicians of the field may add other types of sensing elements in the biometric devices 100b-100h of the aforementioned embodiments, such that the functions of the biometric devices can be more comprehensive and diversified. The added sensing elements are, for example, used for sensing the biological body, sensing an environment in which the biological body is located or providing other sensing functions, which is not limited by the disclosure.

In summary, since the biometric device of the embodiment of the disclosure adopts the design of the optical layer to replace the conventional optical module with a large volume, and the surface of the optical layer is similar to a planar optical layer, the biometric device of the disclosure has an advantage of thinning tendency. Moreover, in the biometric device of another embodiment of the disclosure, the optical layer thereof has the lens portion, such that the biometric device may provide a planar light source to decrease intensity and power consumption of the IR LEDs required in subsequent recognition illumination. In addition, since the biometric method of the disclosure adopts a method of sequentially lighting the IR LEDs, the amount of data processed by the image sensor is decreased, such that an image processing speed is accelerated to quickly obtain a recognition result.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A biometric device, comprising:
a substrate;
an image sensor, disposed on the substrate, and comprising a plurality of photosensing units;
a plurality of infrared light emitting diodes, disposed on the substrate, wherein the infrared light emitting diodes and the photosensing units are arranged in interleaving; and
an optical layer, comprising a plurality of more than one lens portions, wherein the lens portions are aligned to a part of the photosensing units, an orthogonal projection of each of the lens portions on the substrate is overlapped with an orthogonal projection of the corresponding photosensing unit on the substrate and a number of the lens portions is less than a number of the photosensing units, and at least one of the photosensing units not covered by the lens portions is arranged between at least two of the photosensing units covered by the lens portions.

2. The biometric device as claimed in claim 1, wherein the photosensing units and the infrared light emitting diodes are located on a same horizontal plane.

3. The biometric device as claimed in claim 1, wherein the optical layer further comprises a transparent panel portion, the transparent panel portion is disposed on the substrate and covers the infrared light emitting diodes and the photosensing units, and the lens portions are located on a top surface of the transparent panel portion.

4. The biometric device as claimed in claim 1, wherein each of the infrared light emitting diodes has a first upper surface, and each of the photosensing units has a second upper surface, and the first upper surface is lower than the second upper surface.

5. The biometric device as claimed in claim 1, wherein each of the infrared light emitting diodes has a first upper surface, and each of the photosensing units has a second upper surface, and the first upper surface is higher than the second upper surface.

6. The biometric device as claimed in claim 5, further comprising:
a plurality of wall structures, disposed on the substrate and surrounding each of the infrared light emitting diodes, wherein each of the wall structures has a third upper surface, and the third upper surface is higher than the first upper surface.

7. The biometric device as claimed in claim 5, wherein a surrounding surface of each of the infrared light emitting diodes has a reflective material layer, and reflectivity of the reflective material layer is greater than 70%.

8. The biometric device as claimed in claim 1, wherein the optical layer further comprises a transparent panel portion, the transparent panel portion is disposed on the infrared light emitting diodes, and the transparent panel portion, the infrared light emitting diodes and the image sensor define a plurality of air gaps, and the lens portions are located on a top surface of the transparent panel portion.

9. The biometric device as claimed in claim 1, wherein the biometric device is adapted to recognize a biological characteristic of a region of a biological body, and the lens portions are located between the region of the biological body and the corresponding photosensing units.

10. A wearable carrier, adapted to be worn on a user, the wearable carrier comprising:
- a display unit;
- a strip unit, connected to the display unit at a first edge and a second edge opposite to each other; and
- the biometric device as claimed in claim 1, disposed on the display unit or the strip unit for recognizing a biological characteristic of a region of a biological body.

11. The wearable carrier as claimed in claim 10, wherein the biometric device is located on a display surface of the display unit, a back surface of the display unit opposite to the display surface, an outer surface of the strip unit or an inner surface of the strip unit opposite to the outer surface.

12. The biometric device as claimed in claim 1, wherein each of the lens portions covers one of the photosensing units.

\* \* \* \* \*